(12) United States Patent
Hayman et al.

(10) Patent No.: US 7,051,685 B2
(45) Date of Patent: May 30, 2006

(54) CYLINDER HEAD WITH INTEGRATED EXHAUST MANIFOLD

(75) Inventors: Alan W. Hayman, Romeo, MI (US); Rodney E. Baker, Burton, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/909,164

(22) Filed: Jul. 30, 2004

(65) Prior Publication Data

US 2005/0087154 A1    Apr. 28, 2005

Related U.S. Application Data

(60) Provisional application No. 60/514,628, filed on Oct. 27, 2003.

(51) Int. Cl.
F01N 7/06 (2006.01)
F02F 1/36 (2006.01)

(52) U.S. Cl. ................... 123/41.82 R; 60/321
(58) Field of Classification Search ......... 123/41.82 R, 123/41.82 A, 193.5; 60/321
See application file for complete search history.

(56) References Cited

U.S. PATENT DOCUMENTS 6,513,506 B1 *   2/2003   Ito et al. ................ 123/568.13

FOREIGN PATENT DOCUMENTS

EP         1006272 A2    6/2000

* cited by examiner

Primary Examiner—Henry C. Yuen
Assistant Examiner—Hyder Ali
(74) Attorney, Agent, or Firm—Christopher DeVries (57) ABSTRACT

A cylinder head for an internal combustion engine (ICE) includes a lower cooling jacket, an upper cooling jacket and an exhaust manifold disposed therebetween. The exhaust manifold enables exhaust of combustion gas from cylinders of the ICE. The lower cooling jacket has coolant flow paths in fluid communication with coolant flow paths of a cylinder block of the ICE. Coolant flow paths of the upper cooling jacket are in fluid communication with those of the lower cooling jacket through one of a plurality of passages. The passages can be selectively plugged to define coolant flow direction through the cylinder head. The upper and lower cooling jackets are in heat exchange relationship with surfaces of the exhaust manifold to cool exhaust gas flowing therethrough.

16 Claims, 8 Drawing Sheets

CYLINDER HEAD WITH INTEGRATED EXHAUST MANIFOLD

CROSS-REFERENCE TO RELATED APPLICATIONS

This application claims the benefit of U.S. Provisional Application No. 60/514,628, filed on Oct. 27, 2003. The disclosure of the above application is incorporated herein by reference.

FIELD OF THE INVENTION

The present invention relates to internal combustion engines, and more particularly to a cylinder head with integrated exhaust manifold.

BACKGROUND OF THE INVENTION

An internal combustion engine (ICE) combusts fuel to produce driving force. The ICE typically includes a series of reciprocating pistons that drive a crankshaft. The pistons are slidably disposed within cylinders formed in a cylinder block. A cylinder head is secured to the cylinder block sealing the pistons within the cylinders.

The cylinder head is the detachable part of the top of the ICE that contains spark plugs, inlet valves, exhaust valves and may contain a camshaft. It seals the cylinder and forms the top of the combustion chamber. Generally, the cylinder head is an aluminum or iron casting that houses the combustion chambers, the intake and exhaust ports, and much or all of the valvetrain. The head (or heads, if an engine has more than one bank of cylinders) is always directly above the cylinders. An exhaust manifold is a network of passages that gathers exhaust gases from the various cylinder exhaust ports. The exhaust manifold is typically a separate component coupled to the cylinder head with threaded fasteners. The exhaust manifold routes the gases toward the catalysts and mufflers of the exhaust system. The cylinder head and cylinder block include a series of passages that facilitate coolant flow. Coolant is circulated through the passages to cool the cylinders, the area above the combustion chamber and the valvetrain components.

ICE manufacturers continuously strive to improve the overall operating efficiency of the ICE, as well as reducing costs associated with manufacture of the ICE. Traditional ICEs are more complex and inefficient than desired, making manufacture and assembly more difficult and more expensive.

SUMMARY OF THE INVENTION

Accordingly, the present invention provides a cylinder head for an internal combustion engine (ICE). The cylinder head includes a lower cooling jacket, an upper cooling jacket and an exhaust manifold disposed therebetween. The exhaust manifold enables exhaust of combustion gas from cylinders of the ICE. The lower cooling jacket has coolant flow paths in fluid communication with coolant flow paths of a cylinder block of the ICE. Coolant flow paths of the upper cooling jacket are in fluid communication with those of the lower cooling jacket through one of a plurality of passages. The passages can be selectively plugged to define coolant flow direction through the cylinder head. The upper and lower cooling jackets are in heat exchange relationship with surfaces of the exhaust manifold to cool exhaust gas flowing therethrough.

An improved exhaust manifold geometry is achieved and assembly of the cylinder head is made easier. Bends in exhaust ports of the exhaust manifold occur much earlier along the length of the exhaust port than was traditionally achievable. The bends in a traditionally designed exhaust port do not occur until after a substantially long straight section of the exhaust port. As a result, the exhaust manifold geometry of the present invention enables improved catalytic converter warm-up rates, improved heater warm-up performance and reduced exhaust flow restriction.

Overall cost is reduced as a result of reduced complexity of the exhaust manifold. Further, for V-shaped ICEs, identical cylinder head castings can be used for both sides of the ICE. This reduces the tooling and variety of castings required because the identical cylinder heads can be used for both sides of the ICE.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
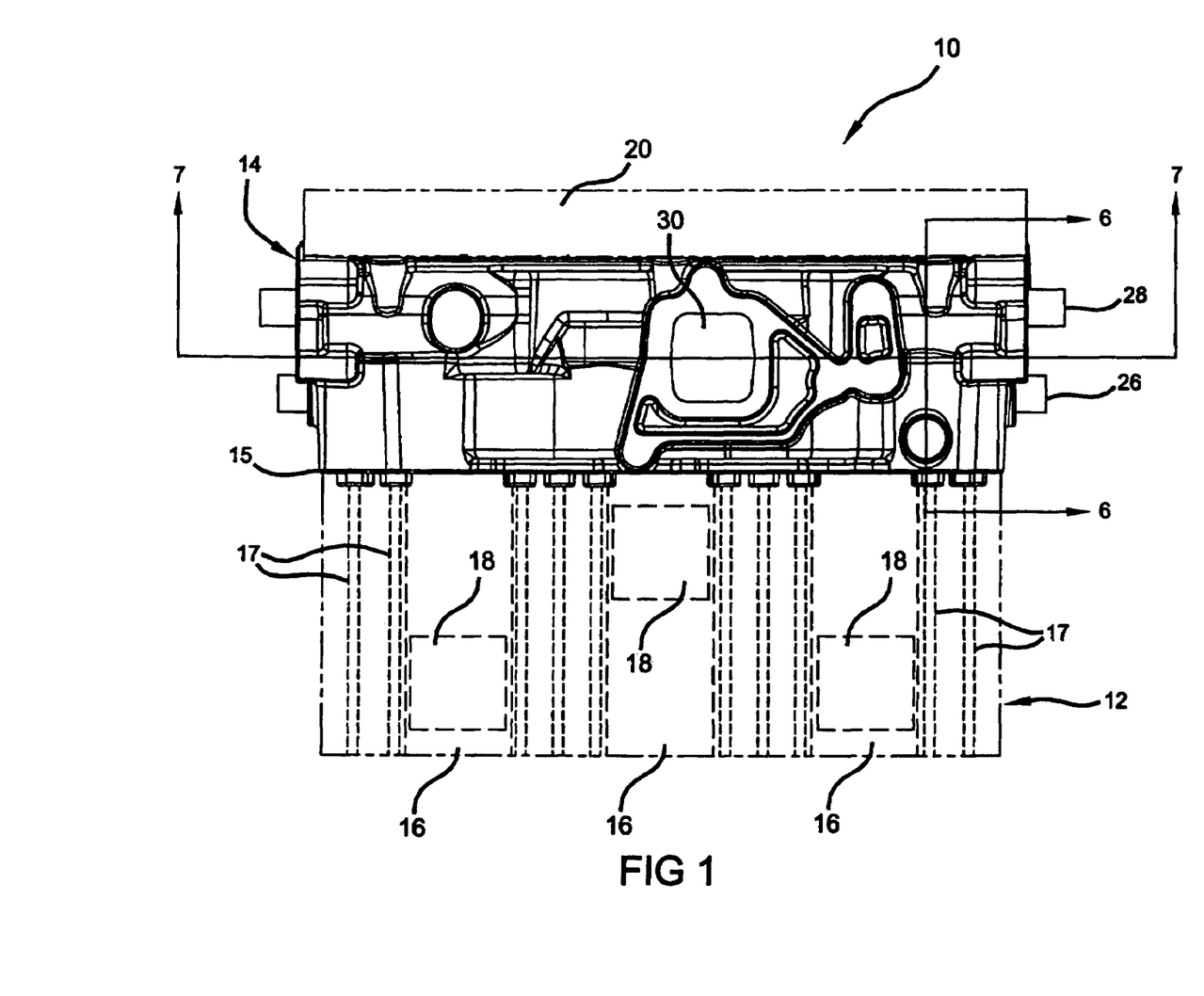
FIG. 1 is a schematic illustration of an internal combustion engine (ICE) including a cylinder head having an integrated exhaust manifold according the principles of the present invention.

Referring now to FIG. 1, a schematic illustration of an internal combustion engine (ICE) 10 is shown. The ICE 10 includes a cylinder block 12 (shown schematically in phantom) with a cylinder head 14 secured thereto. A gasket 15 is disposed between the cylinder block 12 and the cylinder head 14. The cylinder block 12 includes a series of cylinders 16 bored therein. The number of cylinders 16 in the ICE 10 can vary depending on the particular design. For example, the ICE can include 3, 4, 6, 7, 10 or 12 cylinders. A piston 18 is slidably disposed within each of the cylinders 16. The pistons 18 are connected to a camshaft (not shown) by respective cams (not shown). An intake manifold (not shown) enables a flow of air into the cylinders 16 to mix with fuel injected therein. This fuel/air mixture is combusted within the individual cylinders 16 to produce a driving force. The combusted gases are exhausted back out the cylinder head 14. A valvetrain 20 (shown schematically in phantom) supports intake and exhaust valves (not shown) and associated cam shafts (not shown). The valvetrain 20 regulates the inlet and exhaust of fuel, air and combustion gas from the cylinders 16.

Referring now to FIGS. 1 through 7, the cylinder head 14 includes a multi-piece housing 22 that supports an exhaust assembly 24. The exhaust assembly 24 includes a lower cooling jacket 26, an upper cooling jacket 28 and an exhaust manifold 30 disposed therebetween. The lower and upper cooling jackets 26, 28 facilitate cooling of the exhaust manifold 30 and valvetrain 20. More particularly, as the combustion process occurs within each cylinder 16, heat is generated. A coolant system (not shown) regulates the temperature of the ICE 10 to prevent overheating. A flow of coolant enters the cylinder block 12 and is distributed throughout a series of coolant flow paths 17 to cool the individual cylinders 16. As described in further detail below, the coolant flows into the lower cooling jacket 26 and the upper cooling jacket 28 to cool the exhaust manifold 30 and valvetrain 20. The coolant is exhausted from the ICE 10 and recycled back through the coolant system.

Figure 2:
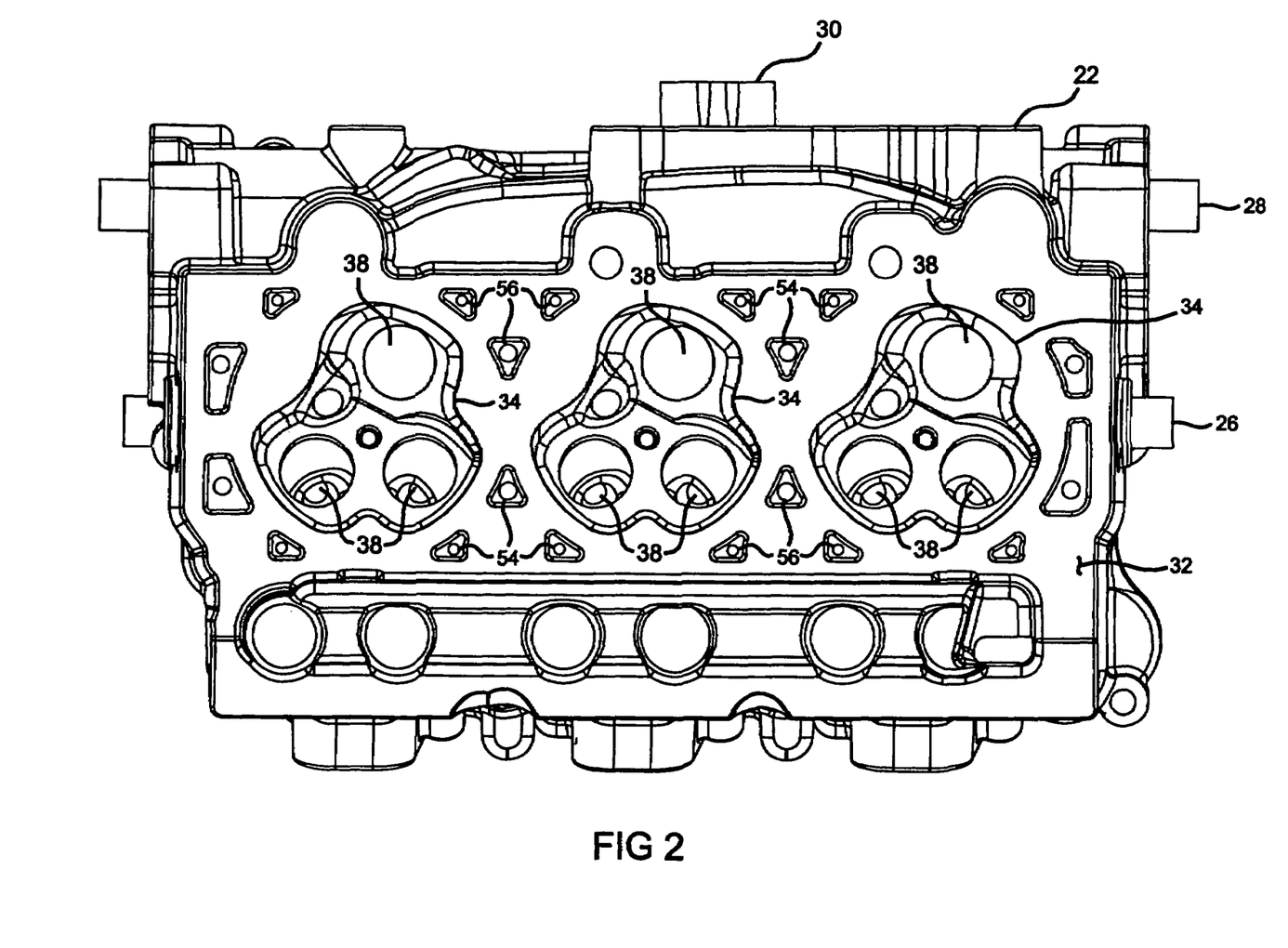
FIG. 2 is a bottom view of the cylinder head.
Figure 3:
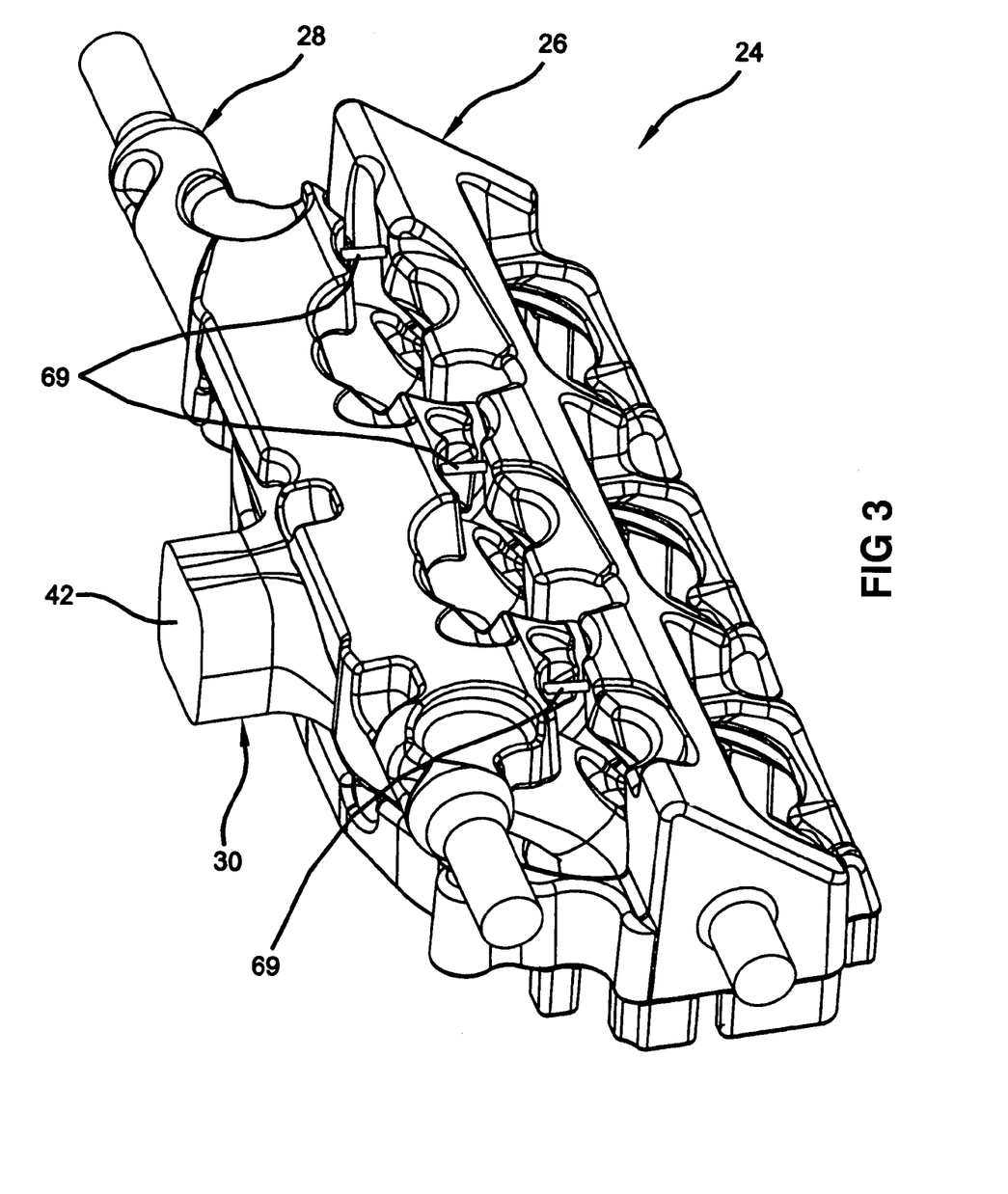
FIG. 3 is a perspective view of an exhaust manifold and cooling jacket assembly of the cylinder head.
Figure 4:
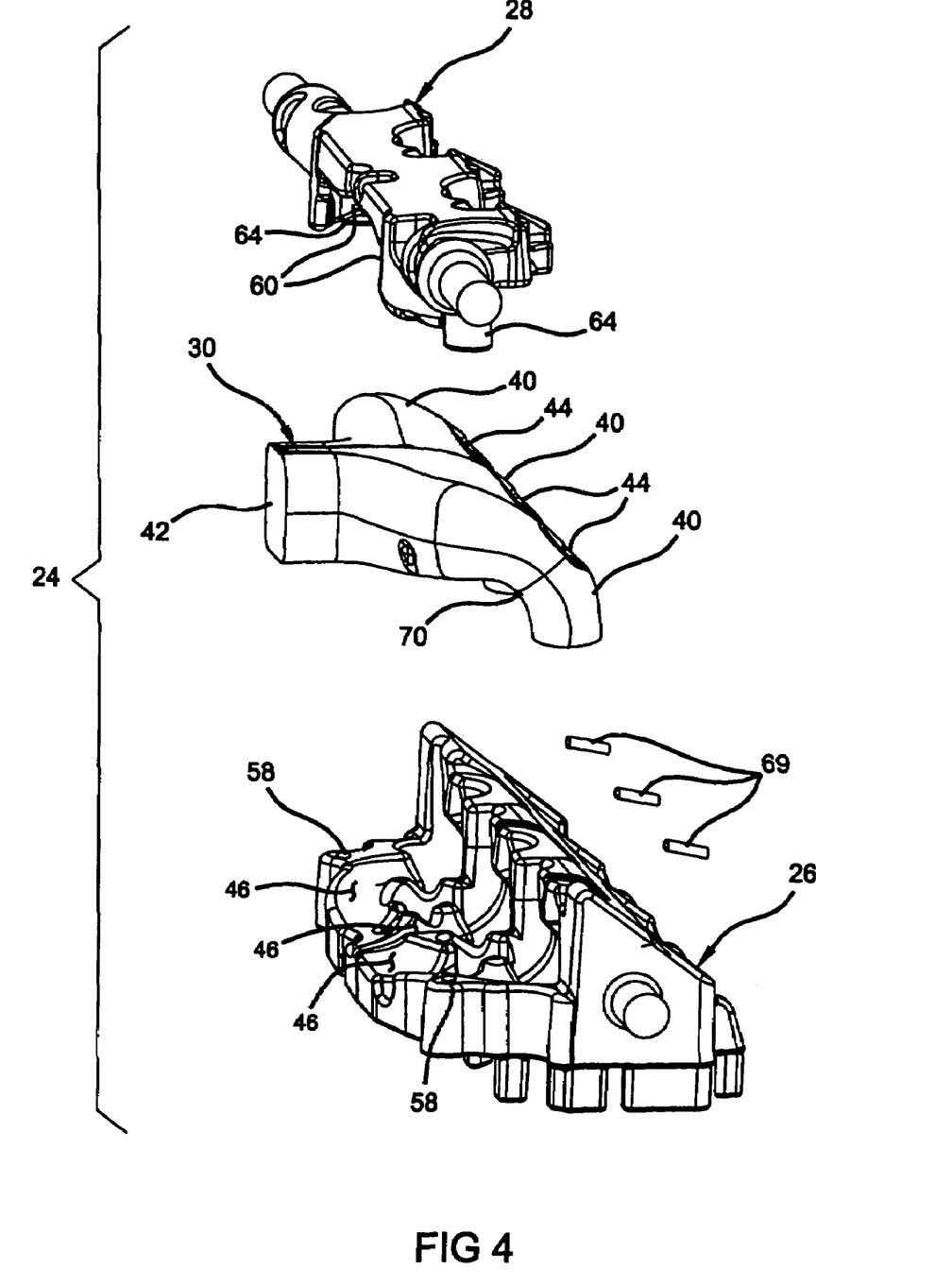
FIG. 4 is an exploded perspective view of the exhaust manifold and upper and lower cooling jackets of the cylinder head.
Figure 5:
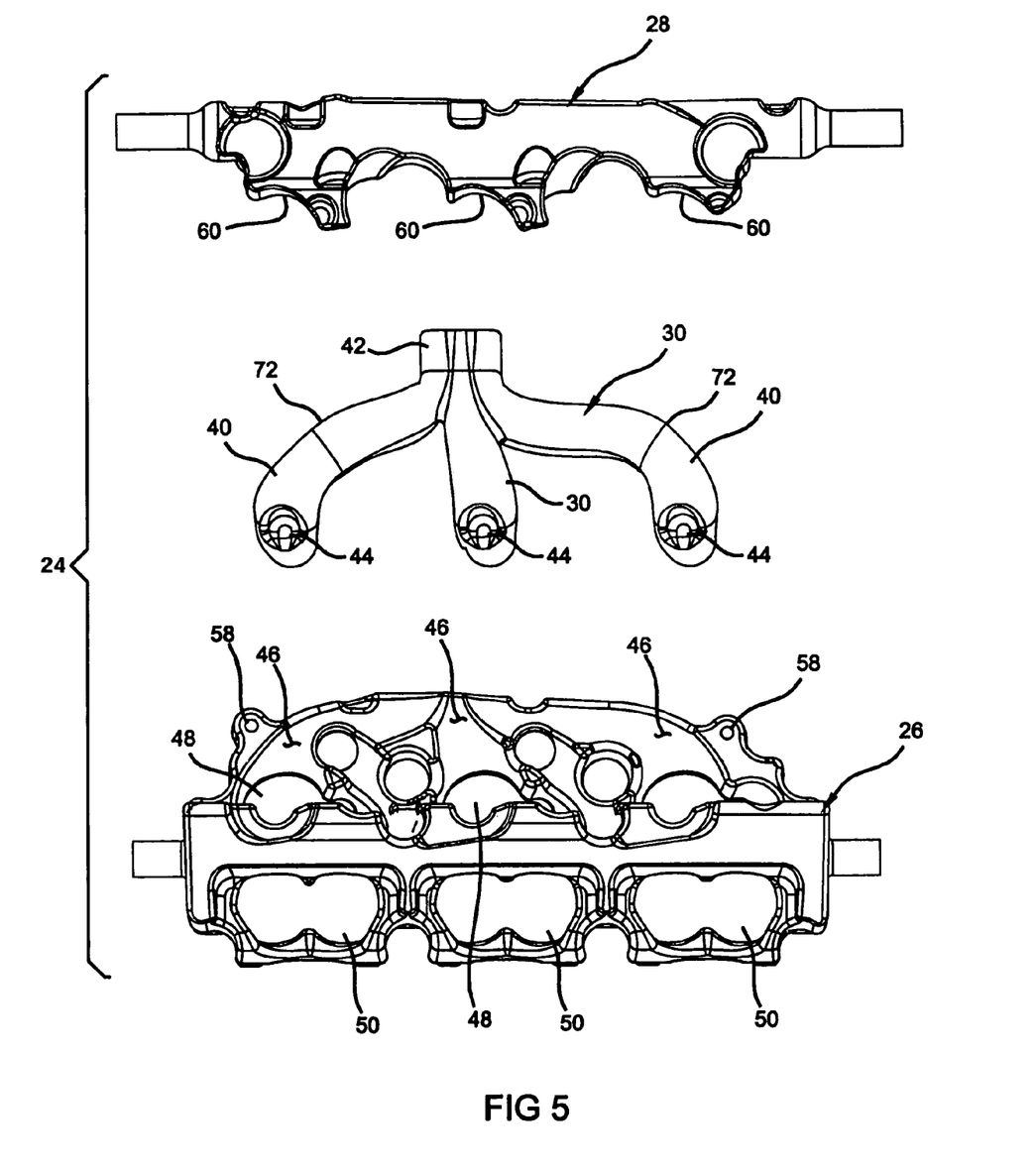
FIG. 5 is an alternative exploded perspective view of the exhaust manifold and the upper and lower cooling jackets.
Figure 6:
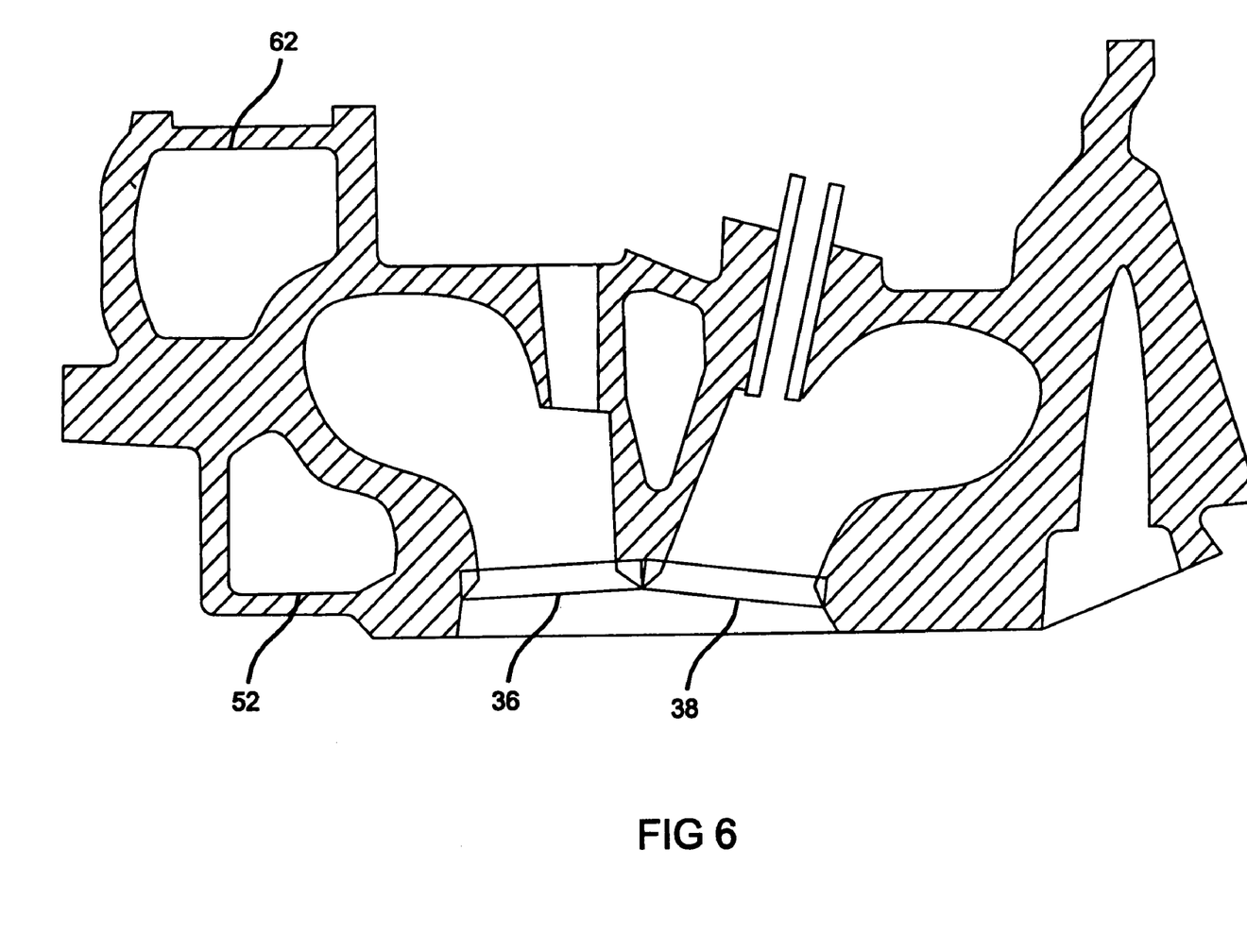
FIG. 6 is a cross-sectional view of the exhaust manifold and upper and lower cooling jackets along line 6—6 of FIG. 1.
Figure 7:
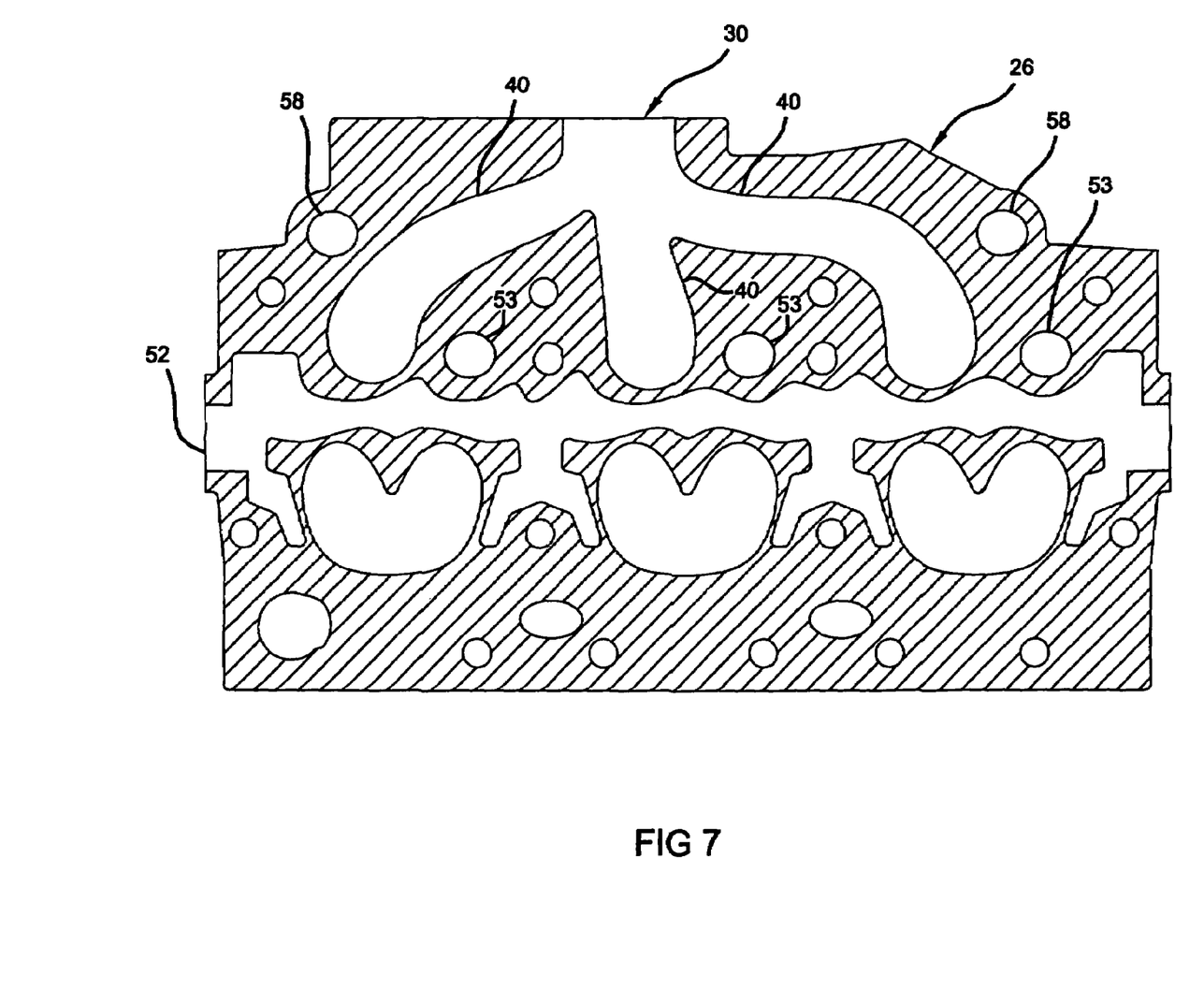
FIG. 7 is a cross-sectional view of the lower cooling jacket and the exhaust manifold along line 7—7 of FIG. 1.

The multi-piece housing 22 includes a top face to which the valvetrain 20 is fixed. A bottom face 32 of the multi-piece housing 22 seats against the cylinder block 12 with the gasket 15 disposed therebetween. The bottom face 32 includes cylinder clusters 34 associated with each cylinder 16. The cylinder clusters 34 each include intake inlets 36 and an exhaust outlet 38 formed therein. The intake inlets 36 are in fluid communication with the intake manifold to enable intake of air into the cylinders 16. The exhaust outlets 38 are in fluid communication with the exhaust manifold 30 to enable exhaust of combustion gas from the cylinders 16.

The exhaust manifold 30 includes a series of exhaust ports 40 that merge into a collecting area 42. The exhaust ports 40 each include a bore 44 through which a stem (not shown) of a valve (not shown) extends. The valve is slidably supported through the bore 44 to selectively enable flow through the exhaust outlet 38 (see FIGS. 2 and 6). The collecting area 42 is on an exhaust side of the cylinder head 14 opposite to an inlet side that includes the inlets 36 (see FIGS. 2 and 6). Exhaust exits the ICE 10 through the merged exhaust ports 40 which are substantially equidistant from the front and rear of the cylinder head 14.

The lower cooling jacket 26 is a casting that includes geometry formed to receive the exhaust ports 40. More specifically, the lower cooling jacket 26 includes contoured surfaces 46 that accommodate the exhaust ports 40 and apertures 48 through which the exhaust ports 40 extend to interface with the exhaust outlets 38 of the cylinder clusters 34. Apertures 50 are formed through the inlet side of the lower cooling jacket 26 to enable mechanical communication between the valvetrain components (i.e., inlet valves) and the inlets 36.

A central coolant flow path 52 (see FIG. 7) formed within the lower cooling jacket 26 cools a lower portion of the exhaust manifold 30. Auxiliary coolant flow paths 53 branch from the central coolant flow path 52. Stems 54 extend from the bottom face 32 and include coolant ports 56 bored therethrough (see FIG. 2). The coolant ports 56 enable fluid communication between the coolant flow paths 17 of the cylinder block 12 and the central coolant flow path 52 of the lower cooling jacket 26. The coolant ports 56 are metered (i.e. have varying diameters) to regulate the flow rate therethrough. Passages 58 are formed on either end of the lower cooling jacket 26 to facilitate fluid communication between the lower and upper cooling jackets 26, 28, as explained in further detail below.

The upper cooling jacket 28 is a casting that includes geometry to accommodate the exhaust manifold 30 and interconnection to the lower cooling jacket 26. The upper cooling jacket 28 includes contoured surfaces 60 that accommodate the exhaust ports 40 and includes a central coolant flow path 62 (see FIG. 6) that is in fluid communication with the central flow path 52 of the lower cooling jacket 26. The upper cooling jacket 28 cools an upper portion of the exhaust manifold 30.

Passages 64 are formed on either end of the upper cooling jacket 28 that align with the passages 58 of the lower cooling jacket 26. The passages 58, 64 facilitate fluid communication between the central flow paths 52, 62 of the lower and upper cooling jackets 26, 28, respectively. One of the passage sets 52, 62 can be plugged to obtain a desired flow path through the lower and upper cooling jackets 26, 28. A series of vent passages 69 interconnect the lower and upper cooling jackets 26, 28. The vent passages 69 enable venting of cooling fluid between the lower and upper cooling jackets 26, 28. More specifically, the vent passages 69 bridge the lower cooling jacket 26 and the upper cooling jacket 28 to enable fluid to pass therebetween. In this manner, additional fluid communication paths are provided between the lower and upper cooling jackets 26, 28.

Figure 8:
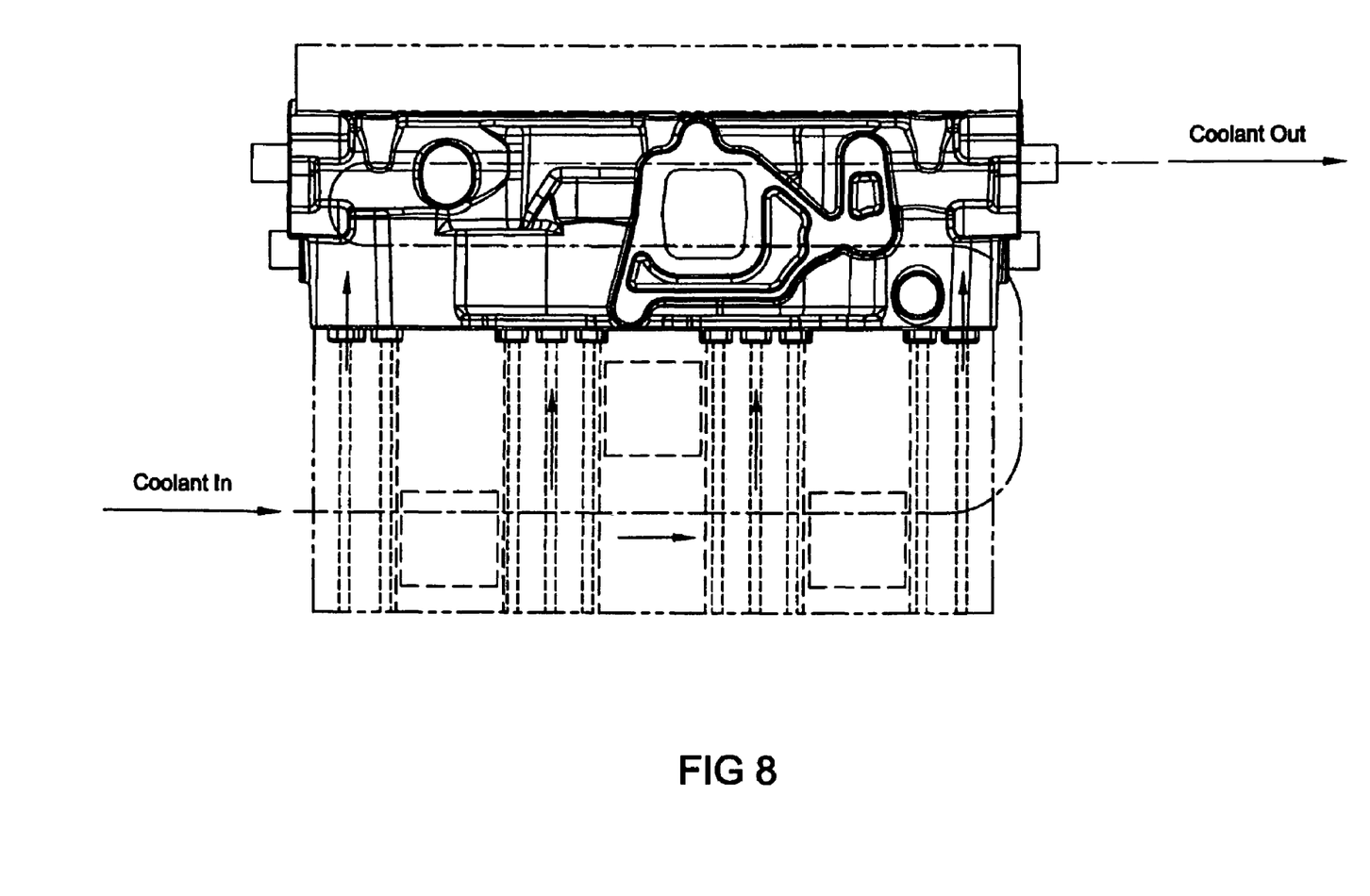
FIG. 8 is the schematic illustration of the ICE of FIG. 1 detailing a coolant flow path according to the principles of the present invention.

Referring now to FIG. 8, an exemplary coolant flowpath through the ICE 10 will be described in detail. Although each of the flow channels described herein are not specifically illustrated in the schematic illustration of the ICE 10, the black arrows in conjunction with the dashed line indicate the herein described flow path. Coolant flows into a front end of the cylinder block 12 and is distributed across the cylinder block 12 including flow through the flow paths 17 adjacent to the cylinders 16. Although some coolant flows up into the lower cooling jacket 26 through the coolant ports 56, a larger portion of the coolant flows into the lower cooling jacket 26 through a passage (not shown) at the back end of the cylinder block 12.

The passages 58, 64 between the lower cooling jacket 26 and the upper cooling jacket 28 at the back end of the cylinder block 12 are plugged. As a result, the coolant flows through the central coolant flow path 52 toward the front end of the cylinder block 12. As the coolant flows through the central coolant flow path 52, additional coolant flows into the central coolant flow path 52 from the coolant ports 56. The passages 58, 64 between the lower cooling jacket 26 and the upper cooling jacket 28 at the front end of the cylinder block 12 enable the aggregate coolant to flow into the upper cooling jacket 28. The coolant flows through the central flow path 62 of the upper cooling jacket 28 and is exhausted out of the cylinder head 14 to be recycled through the coolant system.

The exemplary flow path described above provides an S-shaped flow path through the ICE 10. More specifically, coolant flows through the cylinder block 12 from the front end to the back end, back across through the lower cooling jacket 26 and across again through the upper cooling jacket 28. Coolant flow through the lower cooling jacket 26 draws heat from the lower portion of the exhaust manifold 30. Coolant flow through the upper cooling jacket 28 draws heat from the upper portion of the exhaust manifold 30.

Assembly of the cylinder head 14 of the present invention is easier and an improved exhaust manifold is achieved. More particularly, the geometry of the exhaust ports 40 of the exhaust manifold 30 of the present invention is substantially improved over that of traditional designs. For example, a first and second bends 70, 72 (see FIGS. 4 and 5) in the exhaust port 40 occur much earlier along the length of the exhaust port 40 than was traditionally achievable. The bends in traditionally designed exhaust ports do not occur until after a substantially long straight section of the exhaust port. Accordingly, the geometry of the exhaust manifold 30 enables improved catalytic converter warm-up rates and improved heater warm-up performance.

Several advantages are realized by the cylinder head 14 of the present invention. Overall cost is reduced as a result of reduced complexity of the exhaust manifold 30. Further, for V-shaped ICEs identical cylinder head castings can be used for both sides of the ICE. This reduces the tooling and variety of castings required because the identical cylinder heads can be used for both sides of the ICE.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

The invention claimed is:

1. A cylinder head for an internal combustion engine (ICE), comprising:
 a lower cooling jacket having a first coolant flow path in fluid communication with a coolant flow path of a cylinder block of said ICE;
 an upper cooling jacket having a second coolant flow path in fluid communication with said first coolant flow path of said lower cooling jacket; and
 an exhaust manifold disposed between said lower cooling jacket and said upper cooling jacket, wherein said upper cooling jacket and said lower cooling jacket include apertures that enable fluid communication between said first and second coolant flow paths, and further wherein said apertures can be selectively plugged to define a flow pattern through said cylinder head.

2. A cylinder head for an internal combustion engine (ICE), comprising:
 a lower cooling jacket having a first coolant flow path in fluid communication with a coolant flow path of a cylinder block of said ICE;
 an upper cooling jacket having a second coolant flow path in fluid communication with said first coolant flow path of said lower cooling jacket;
 an exhaust manifold disposed between said lower cooling jacket and said upper cooling jacket; and
 a vent passage that bridges said lower cooling jacket and said upper cooling jacket to enable gaseous fluid to pass therebetween.

3. An engine having a plurality of cylinders, comprising:
 a valvetrain that regulates an intake flow and an exhaust flow of a first set of cylinders of said plurality of cylinders; and
 a first cylinder head that supports said first valvetrain and comprises:
  a first lower cooling jacket having a first coolant flow path in fluid communication with a coolant flow path of a cylinder block of said ICE;
  a first upper cooling jacket having a second coolant flow path in fluid communication with said first coolant flow path of said first lower cooling jacket; and
  a first exhaust manifold disposed between said first lower cooling jacket and said first upper cooling jacket and that directs said exhaust flow from said first set of cylinders, wherein said first upper cooling jacket and said first lower cooling jacket include apertures that enable fluid communication between said first and second coolant flow paths, and further wherein said apertures are selectively plugged to define a flow pattern through said first cylinder head.

4. An engine having a plurality of cylinders, comprising:
 a valvetrain that regulates an intake flow and an exhaust flow of a first set of cylinders of said plurality of cylinders;
 a first cylinder head that supports said first valvetrain and comprises:
  a first lower cooling jacket having a first coolant flow path in fluid communication with a coolant flow path of a cylinder block of said ICE;
  a first upper cooling jacket having a second coolant flow path in fluid communication with said first coolant flow path of said first lower cooling jacket; and
  a first exhaust manifold disposed between said first lower cooling jacket and said first upper cooling jacket and that directs said exhaust flow from said first set of cylinders; and
 a vent passage that bridges said first lower cooling jacket and said first upper cooling jacket to enable gaseous fluid to pass therebetween.

5. An engine having a plurality of cylinders, comprising:
 a valvetrain that regulates an intake flow and an exhaust flow of a first set of cylinders of said plurality of cylinders;
 a first cylinder head that supports said first valvetrain and comprises:
  a first lower cooling jacket having a first coolant flow path in fluid communication with a coolant flow path of a cylinder block of said ICE;
  a first upper cooling jacket having a second coolant flow path in fluid communication with said first coolant flow path of said first lower cooling jacket; and
  a first exhaust manifold disposed between said first lower cooling jacket and said first upper cooling jacket and that directs said exhaust flow from said first set of cylinders; and
 a second cylinder head that supports said valvetrain and includes:
  a second lower cooling jacket having a third coolant flow path in fluid communication with a coolant flow path of a cylinder block of said ICE;
  a second upper cooling jacket having a fourth coolant flow path in fluid communication with said third coolant flow path of said second lower cooling jacket; and
  a second exhaust manifold disposed between said second lower cooling jacket and said second upper cooling jacket and that directs said exhaust flow from a second set of cylinders.

6. An engine comprising:
 a cylinder block having a plurality of cylinders and a coolant flow path;

a valvetrain that regulates an intake flow and an exhaust flow of a first set of cylinders of said plurality of cylinders;

a lower cylinder head including a first coolant flow path in fluid communication with said coolant flow path of said cylinder block, a first surface and a support for said valvetrain;

an upper cylinder head coupled to said lower cylinder head and being separable therefrom, said upper cylinder head including a second surface engaging said first surface of said lower cylinder head, said upper cylinder head including a second coolant flow path in fluid communication with said first coolant flow path of said lower cylinder head; and an exhaust manifold positioned between said upper cylinder head and said lower cylinder head that directs said exhaust flow from said first set of cylinders.

7. The engine of claim 6 wherein the upper cylinder head includes a plurality of first recesses and the lower cylinder head includes a plurality of second recesses aligned with said plurality of first recesses, the exhaust manifold including spaced apart legs where at least one leg is positioned within one of the aligned set of first and second recesses.

8. The engine of claim 7 wherein the lower cylinder head includes a seat and wherein one of said exhaust manifold legs includes an end face in engagement with said seat.

9. The engine of claim 8 wherein the first coolant flow path terminates at lower ports and the second coolant path terminates at upper ports, the upper and lower ports being aligned with one another to position the first and second coolant paths in fluid communication with one another.

10. The engine of claim 9 wherein a coolant is operable to pass through the lower cylinder head in a first direction and pass through the upper cylinder head in an opposite direction.

11. The engine of claim 7 wherein each leg of the exhaust manifold includes an external surface spaced apart from the lower cylinder head.

12. A cylinder head and exhaust manifold assembly for an internal combustion engine having a cylinder block, the cylinder head and exhaust manifold assembly comprising:

a lower cylinder head including a seat and a first coolant flow path in fluid communication with a coolant flow path of the cylinder block;

an upper cylinder head including a second coolant flow path in fluid communication with said first coolant flow path of said lower cylinder head; and an exhaust manifold positioned between said upper cylinder head and said lower cylinder head, said exhaust manifold including an end face in engagement with said seat.

13. The assembly of claim 12 wherein the upper cylinder head includes a plurality of first recesses and the lower cylinder head includes a plurality of second recesses aligned with said plurality of first recesses, the exhaust manifold including spaced apart legs where at least one leg is positioned within one of the aligned set of first and second recesses.

14. The assembly of claim 13 wherein the first coolant flow path terminates at lower ports and the second coolant path terminates at upper ports, the upper and lower ports being aligned with one another to position the first and second coolant paths in fluid communication with one another.

15. The assembly of claim 13 wherein a coolant is operable to pass through the lower cylinder head in a first direction and pass through the upper cylinder head in an opposite direction.

16. The assembly of claim 13 wherein each leg of the exhaust manifold includes an external surface spaced apart from the lower cylinder head.

* * * * *